US011243432B2

(12) United States Patent
Xu et al.

(10) Patent No.: US 11,243,432 B2
(45) Date of Patent: Feb. 8, 2022

(54) BACKLIGHT FRAME AND DISPLAY DEVICE

(71) Applicant: BOE TECHNOLOGY GROUP CO., LTD., Beijing (CN)

(72) Inventors: Jian Xu, Beijing (CN); Xinyin Wu, Beijing (CN); Yong Qiao, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/796,049

(22) Filed: Feb. 20, 2020

(65) Prior Publication Data

US 2020/0192160 A1    Jun. 18, 2020

Related U.S. Application Data

(63) Continuation-in-part of application No. PCT/CN2018/119551, filed on Dec. 6, 2018.

(51) Int. Cl.
*G02F 1/13357* (2006.01)
*G02F 1/1333* (2006.01)

(52) U.S. Cl.
CPC .. *G02F 1/133608* (2013.01); *G02F 1/133308* (2013.01); *G02F 1/13332* (2021.01); *G02F 2202/28* (2013.01)

(58) Field of Classification Search
CPC ......... G02F 1/133608; G02F 1/133308; G02F 2001/13332; G02F 2202/28;

(Continued)

(56) References Cited

U.S. PATENT DOCUMENTS 5,682,696 A * 11/1997 Gill ........................... G09F 7/12
                                                                         248/156
6,565,697 B1 * 5/2003 Maercklein ................ C09J 7/38
                                                                         156/289

(Continued)

FOREIGN PATENT DOCUMENTS

CN         203177084 U     9/2013
CN         203322880 U    12/2013

(Continued)

OTHER PUBLICATIONS

International Search Report dated Feb. 27, 2019 corresponding to application No. PCT/CN2018/119551.

(Continued)

*Primary Examiner* — Tsion Tumebo
(74) *Attorney, Agent, or Firm* — Nath, Goldberg & Meyer; Joshua B. Goldberg (57) ABSTRACT

The present disclosure relates to a backlight frame including a backplane; a plastic frame comprising: a planar portion configured to carry a panel, and a plastic frame assembly portion on the side away from the panel, the plastic frame assembly portion being configured to fix the plastic frame to the backplane; a retaining wall substantially perpendicular to the planar portion, the retaining wall comprising a side facing the panel and a side away from the panel; and a plurality of soft adhesive strips substantially parallel to each other on the planar portion, the soft adhesive strips being on the side facing the panel and in contact with the panel.

19 Claims, 9 Drawing Sheets

(58) Field of Classification Search
CPC ..... G02F 2001/133314; G02F 2201/50; G02F 2201/503; G02F 1/1336; G02F 2201/46; G02F 2001/133331; G02F 2001/133322; G02F 2001/133311; G02F 2201/501; G02B 6/0088; G02B 6/0093
See application file for complete search history.

(56) References Cited

U.S. PATENT DOCUMENTS

| | | | |
|---|---|---|---|
| 7,374,325 B2 * | 5/2008 | Ko | G02F 1/133602 362/607 |
| 7,794,810 B2 * | 9/2010 | Kawada | C09J 7/38 428/40.1 |
| 7,978,284 B2 * | 7/2011 | Hashino | G02F 1/133615 349/61 |
| 9,084,338 B2 * | 7/2015 | Gu | H05K 5/02 |
| 9,649,790 B2 * | 5/2017 | Shinozaki | C09J 7/20 |
| 2004/0004827 A1 | 1/2004 | Guest | |
| 2004/0246397 A1 | 12/2004 | Kang et al. | |
| 2007/0189042 A1 | 8/2007 | Pai et al. | |
| 2010/0245707 A1 * | 9/2010 | Harada | G02F 1/133308 349/58 |
| 2011/0058355 A1 * | 3/2011 | Teng | G02F 1/133308 362/97.2 |
| 2011/0128463 A1 * | 6/2011 | Ji | G02F 1/133308 349/58 |
| 2013/0214656 A1 * | 8/2013 | Huang | G06F 1/1656 312/223.1 |
| 2014/0240606 A1 * | 8/2014 | Tomomasa | G02F 1/133308 348/725 |
| 2016/0377909 A1 * | 12/2016 | Kondoh | G02F 1/133308 349/58 |

FOREIGN PATENT DOCUMENTS

| | | |
|---|---|---|
| CN | 205067908 U | 3/2016 |
| CN | 206163031 U | 5/2017 |
| CN | 206710753 U | 12/2017 |
| CN | 207764519 U | 8/2018 |
| KR | 20170052058 A | 5/2017 |
| WO | 2014015482 A1 | 1/2014 |

OTHER PUBLICATIONS

Extended European Search Report dated Jul. 28, 2021 for application No. EP 18899739.9.

* cited by examiner

BACKLIGHT FRAME AND DISPLAY DEVICE

TECHNICAL FIELD

The present disclosure relates to the field of display, and more particularly to a backlight frame and a display device having the same.

BACKGROUND

As a display device widely used at present, a liquid crystal display device (LCD) has many technical and performance advantages, thereby replacing the early CRT display device. However, during the manufacture and use of the liquid crystal display device, many problems still occur, and the quality of the product is degraded. The quality of the backlight also affects that of the liquid crystal display device.

SUMMARY

A first aspect of the present disclosure relates to a backlight frame, including: a backplane; a plastic frame including: a planar portion configured to carry a panel, and a plastic frame assembly portion on the side away from the panel, the plastic frame assembly portion being configured to fix the plastic frame to the backplane; a retaining wall substantially perpendicular to the planar portion, the retaining wall including a side facing the panel and a side away from the panel; and a plurality of soft adhesive strips substantially parallel to each other on the planar portion, the soft adhesive strips being on the side facing the panel and in contact with the panel.

In some embodiments, the soft adhesive strips are disposed in a direction parallel to an extending direction of the retaining wall.

In some embodiments, the soft adhesive strips are disposed at an acute angle to an extending direction of the retaining wall, and the acute angle is less than or equal to 60°.

In some embodiments, the soft adhesive strips are disposed at an acute angle to an extending direction of the retaining wall, and the acute angle is less than or equal to 45°.

In some embodiments, the soft adhesive strips are disposed at an acute angle to an extending direction of the retaining wall, and the acute angle is 30°.

In some embodiments, surfaces of at least two of the plurality of the soft adhesive strips have a zigzag structure.

In some embodiments, a shape of the zigzag structure is curved or rectangular.

In some embodiments, the planar portion includes a plurality of columns of raised structures and a groove disposed between two columns of the raised structures, the plurality of the columns of the raised structures are spaced apart on the planar portion along a direction perpendicular to an extending direction of the retaining wall, and the soft adhesive strips are positioned on the raised structures.

In some embodiments, the planar portion includes a plurality of columns of raised structures, the plurality of the columns of the raised structures are spaced apart on the planar portion along a direction perpendicular to an extending direction of the retaining wall, two adjacent columns of the raised structures are staggered in the extending direction of the retaining wall, and the soft adhesive strips are positioned on the raised structures.

In some embodiments, spacing between at least two of the soft adhesive strips is greater than or equal to 0.5 mm and less than or equal to 5 mm.

In some embodiments, a side of the retaining wall facing the soft adhesive strips is disposed with a soft adhesive pad, the retaining wall is integrally formed with the plastic frame, and a length of the retaining wall is smaller than a length of the soft adhesive strips in the extending direction of the retaining wall.

In some embodiments, the plastic frame assembly portion includes a screw hole located in a region of the planar portion corresponding to a long side of the retaining wall in the extending direction.

In some embodiments, the planar portion has an opening, the retaining wall is a bent portion of the backplane that is bent toward the planar portion and passes through the opening, and a side of the bent portion facing the soft adhesive strips is pasted with a soft adhesive pad.

In some embodiments in some embodiments, the backplane has four sides, the plastic frame is located on two opposite sides of the four sides of the backplane, and the two opposite sides are two of the four sides having a relatively short length.

In some embodiments, the soft adhesive strips extend to a side edge of the planar portion, and a gap between the adjacent soft adhesive strips is in communication with an outer space of the planar portion.

A second aspect of the present disclosure relates to a display device, including a panel and any one of the backlight frame mentioned above, the panel is placed in the backlight frame.

In some embodiments, the display device further includes a front frame, the front frame has a front frame assembly portion, and the front frame assembly portion and the plastic frame assembly portion are configured to fix the front frame and the backlight frame together.

In some embodiments, each of the front frame assembly portion and the plastic frame assembly portion includes a screw hole, and a diameter of the screw hole of the front frame assembly portion is less than or equal to a diameter of the screw hole of the plastic frame assembly portion.

In some embodiments, the front frame includes a gasket attached to a side surface of the front frame facing the panel, and a material of the gasket is the same as that of the soft adhesive strips.

In some embodiments, the soft adhesive pad is in contact with a side surface of the panel, and a width of the soft adhesive pad in a thickness direction of the panel is greater than or equal to one-half of a thickness of the panel.

BRIEF DESCRIPTION OF THE DRAWINGS

In order to more clearly illustrate the technical solutions of the embodiments of the present disclosure, the drawings to be used in the description of the embodiments will be briefly described below. The drawings in the following description are merely exemplary embodiments of the present disclosure.

DETAILED DESCRIPTION OF THE EMBODIMENTS

The following embodiments are illustrated with reference to the accompanying drawings to illustrate specific embodiments that may be implemented by the present disclosure. In addition, the directional terms mentioned in the present disclosure, such as upper, lower, top, bottom, front, rear, left, right, inner, outer, side, surrounding, central, horizontal, lateral, vertical, longitudinal, axial, radial, uppermost or lowermost, etc., only refer to the direction of the accompanying drawings. Therefore, the directional terms is used to describe and understand the present disclosure and is not intended to limit the present disclosure.

The inner side, unless otherwise specified, refers to a side toward a center of a backplane, or a side toward a center of a liquid crystal panel; and the outer side is the opposite side. The vertical direction refers to a direction perpendicular to a plane of the liquid crystal panel when the liquid crystal display panel of the liquid crystal display device is placed face up horizontally. The horizontal direction refers to a direction in a horizontal plane parallel to the plane of the liquid crystal panel, which depends on the plane of the structure.

Hereinafter, a backlight frame of the present disclosure will be described by carrying the liquid crystal panel as an example. It should be understood that the backlight frame of the present disclosure is not limited to application to the liquid crystal display device. The embodiments of the present application will be further described in detail below with reference to the accompanying drawings.

Figure 1:
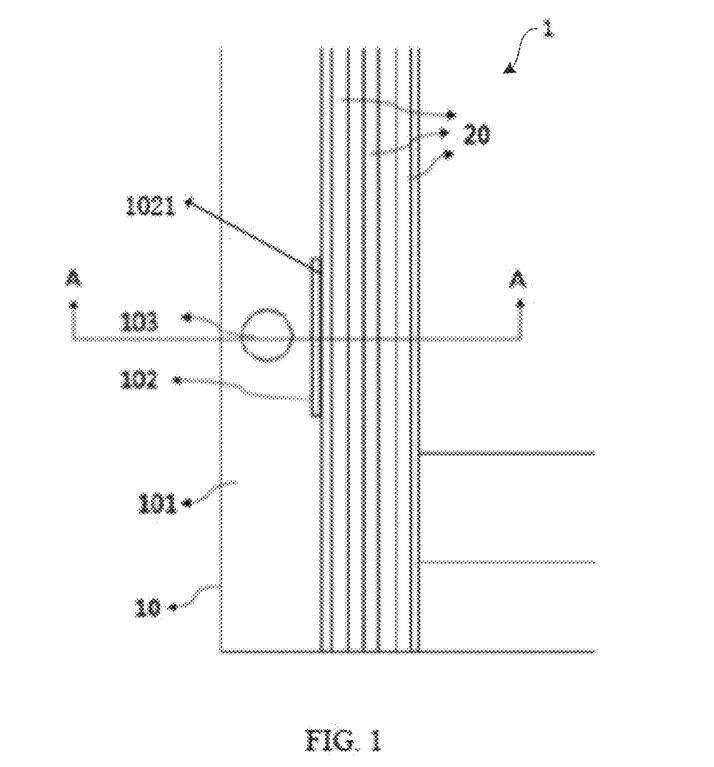
FIG. 1 is a top plan view of a backlight frame in accordance with an embodiment of the present disclosure.
Figure 2:
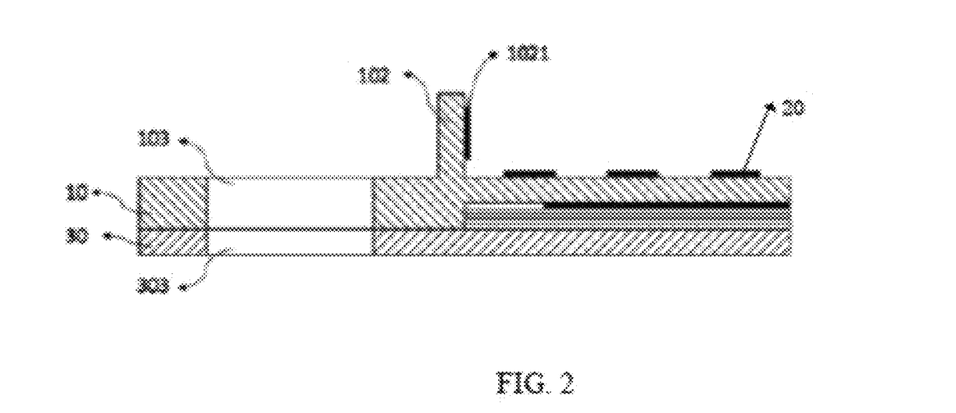
FIG. 2 is a cross-sectional view taken along line A-A of FIG. 1.

FIG. 1 and FIG. 2 illustrate an embodiment of a backlight frame according to the present disclosure. As shown in FIG. 1, the backlight frame 1 includes a rigid plastic frame (mold frame) 10 having a planar portion 101 carrying a liquid crystal panel. As shown in FIG. 2, a side of the planar portion 101 near a long side (for example, the left side in FIG. 2) is provided with a retaining wall 102 substantially perpendicular to the planar portion. The retaining wall includes a side facing the panel and a side away from the panel. The retaining wall 102 is configured to abut a side edge of the liquid crystal panel 2. The words "substantially perpendicular to" as used herein means that an angle between the retaining wall and the planar portion is about 90°±10°, and in another embodiment is 90°±2°. The angle applied in this embodiment is 90°. The planar portion 101 is divided into two regions by the retaining wall 102, and three soft adhesive strips 20 (for example, silicone pads as shown in drawings) which are substantially parallel to each other are pasted on an inner side region of the planar portion near the inner side (for example, the right side of FIG. 2). In other words, the soft adhesive strips are on the side facing the panel and are in contact with the panel. As used herein, the words "substantially parallel to each other" means that the angle between each adjacent two soft adhesive strips in a direction of the long side is about 0°±10°, and in another embodiment is 0°±5°. In this embodiment, the adjacent soft adhesive strips are parallel to each other, that is, the angle in the direction of the long side is 0°, and an outer side region of the planar portion near the outer side (for example, the left side of FIG. 2) is provided with a plastic frame assembly portion (for example, screw hole 103). In other words, on the side of the retaining wall 102 facing the liquid crystal panel 2, the planar portion 101 is provided with a plurality of soft adhesive strips substantially parallel to each other; and on the side of the retaining wall 102 away from the liquid crystal panel 2, the planar portion 101 is provided with the plastic frame assembly portion. In the embodiment in which the screw hole is used as the plastic frame assembly portion, the screw hole may be a self-tapping screw hole. When assembled with a screw, the debris in the screw hole is easily scattered to the periphery, which is one of the sources of foreign matters in the backlight. As shown in FIG. 2, the backlight frame 1 further includes a metal backplane 30. The backplane 30 is provided with a screw hole 303 of the same size as the screw hole 103 in the outer side region of the planar portion of the plastic frame 10, so that the plastic frame 10 and the backplane 30 are fixed together by the screw. A barrier zone is formed by a plurality of soft adhesive strips 20 (three strips as shown in FIG. 2) which are substantially parallel to each other, and the foreign matters in the outer side region of the planar portion is prevented from diffusing toward the inside of the backlight. It can be understood that materials in addition to silica gel mats may be used as the materials of the soft adhesive strips, such as high molecular polymer materials with a Shore hardness of 40 A to 80 A. When the plastic frame is also a soft material, the plurality of soft adhesive strips may be integrally formed with the plastic frame. In addition, the plastic frame assembly portion of the planar portion may adopt other forms, such as a clip structure or the like, as long as the plastic frame can be fixed to the backplane. In some embodiments, as shown in FIG. 1, the soft adhesive strips 20 are disposed in a direction parallel to an extending direction of the retaining wall 102. This facilitates the bonding of the soft adhesive strips 20 on the plastic frame 10, and also facilitates the increase of the number of the barrier zones under the same width of the plastic frame and the same width of the silicone pad, so as to achieve a better foreign matter prevention effect. Here, the extending direction of the retaining wall 102 refers to a direction in which the retaining wall extends on the planar portion, such as the up and down direction in FIG. 1. Further, an edge of the retaining wall 102 in its extending direction is referred to as the long side of the retaining wall 102.

Figure 3:
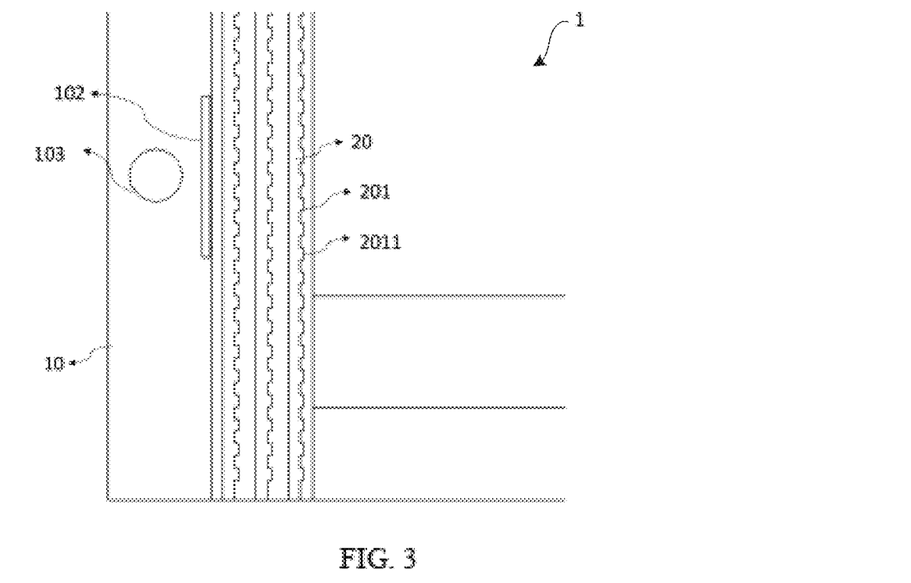
FIG. 3 is a top plan view of a backlight frame in accordance with an embodiment of the present disclosure.
Figure 4:
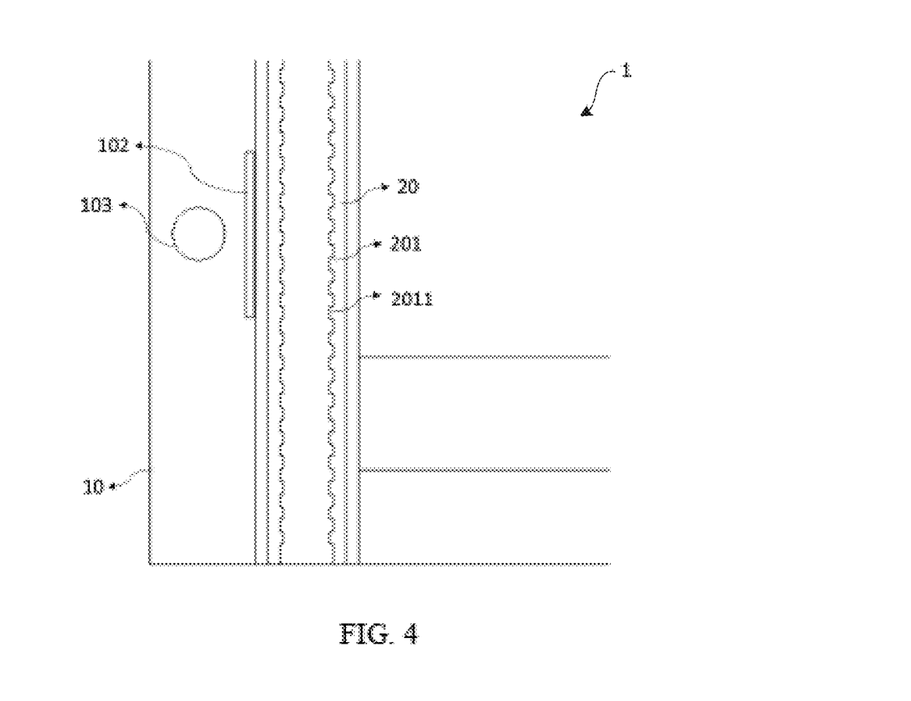
FIG. 4 is a top plan view of a backlight frame in accordance with an embodiment of the present disclosure.

In some embodiments, at least two of the plurality of the soft adhesive strips 20 have a zigzag structure 201 formed by a protrusion of the soft adhesive strips. As shown in FIG. 3 or FIG. 4, a side edge of the soft adhesive strips 20 may have the zigzag structure 201 formed by the protrusions 2011 spaced apart from each other on the side edge of the soft adhesive strips 20. The zigzag structure 201 can increase the difficulty of moving foreign matters toward an inside of the backlight, and better achieve an effect of preventing foreign matters from entering the inside of the backlight. The zigzag structures 201 of adjacent silicone pads may face the same direction (for example, a direction toward the inside of the backlight) as shown in FIG. 3, or may be disposed face to face as shown in FIG. 4.

In some embodiments, as shown in FIG. 3 or FIG. 4, the protrusion 2011 may be rectangular. It should be noted that the shape of the protrusion 2011 may also be other shapes such as a cured shape, a semicircular shape or other irregular shapes.

Figure 5:
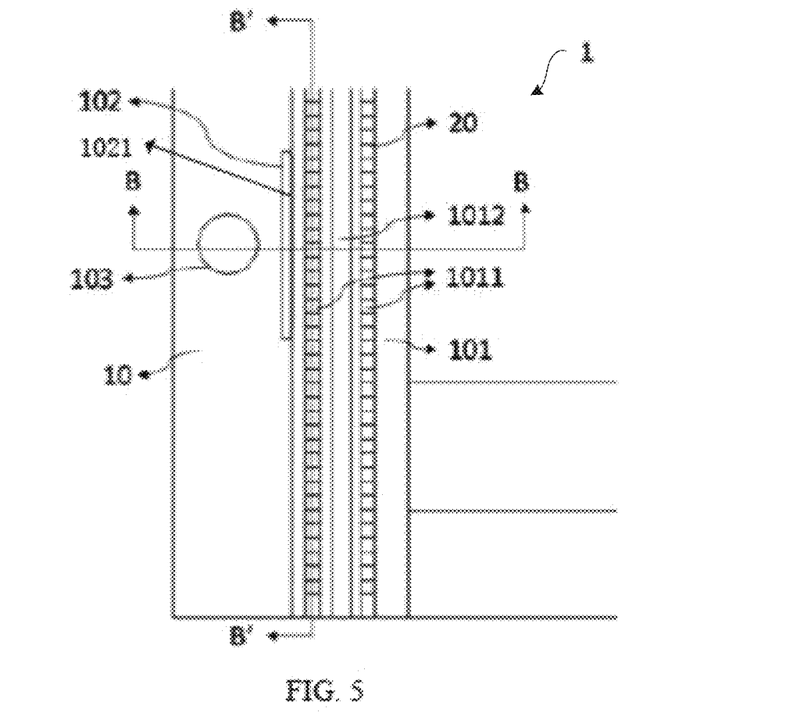
FIG. 5 is a top plan view of a backlight frame in accordance with an embodiment of the present disclosure.
Figure 6:
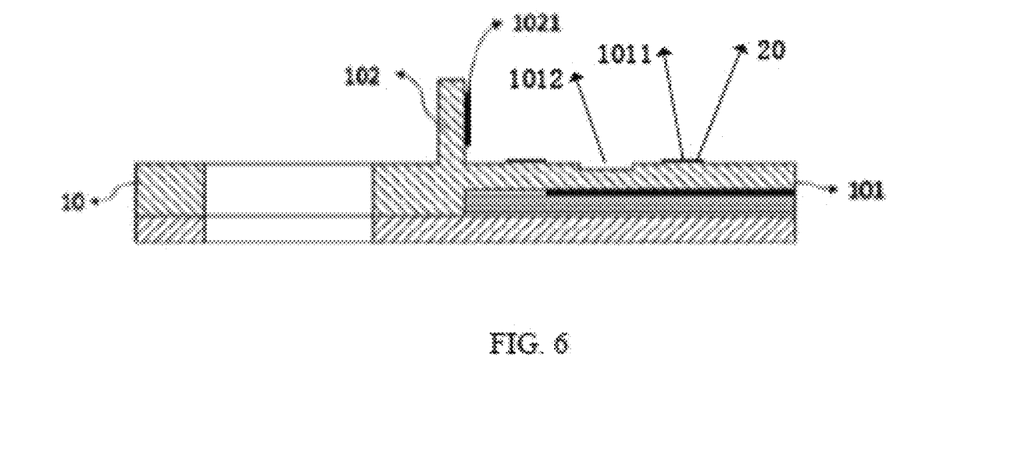
FIG. 6 is a cross-sectional view taken along line B-B of FIG. 5.
Figure 7A:
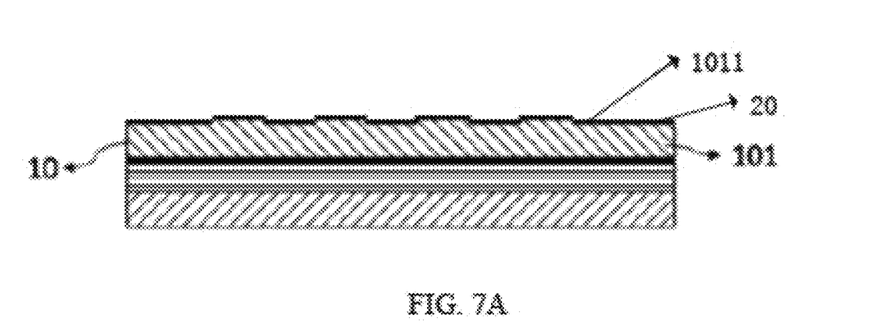
FIG. 7A is a cross-sectional view taken along line B'-B' of FIG. 5.
Figure 7B:
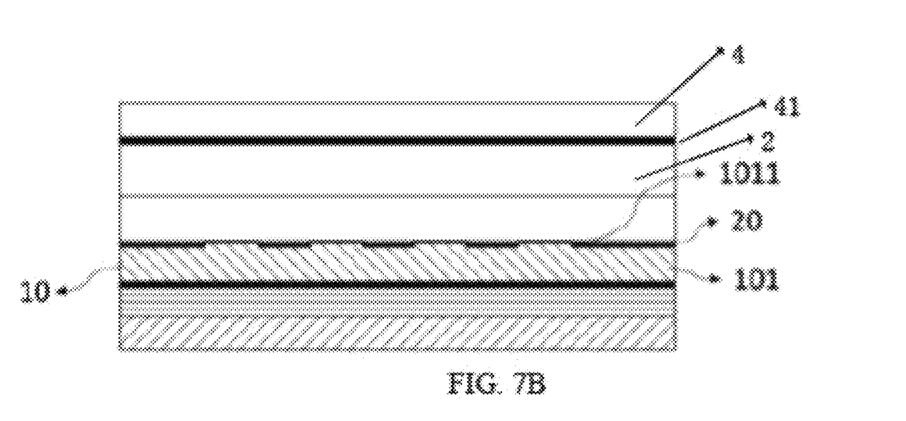
FIG. 7B is a cross-sectional view taken along line B'-B' of FIG. 5 when a display device is assembled onto the backlight frame.

In some embodiments, as shown in FIG. 5. FIG. 6 and FIGS. 7A and B, the inner side region of the planar portion 101 of the plastic frame 10 (i.e., the side of the retaining wall 102 facing the liquid crystal panel) has a protuberance 1011 and a groove 1012. The protuberance 1011 and the groove 1012 can be integrally formed with the plastic frame by an injection molding process. The soft adhesive strip 20 is adhered to a region where the protuberance 1011 is located and covers the protuberance 1011. The protuberances 1011 are spaced apart on the planar portion 101 in the extending direction of the retaining wall 102. In this design, the soft adhesive strip 20 forms a comb-shaped structure that can intercept large foreign matters and accommodate small foreign matters in the groove 1012.

Figure 8:
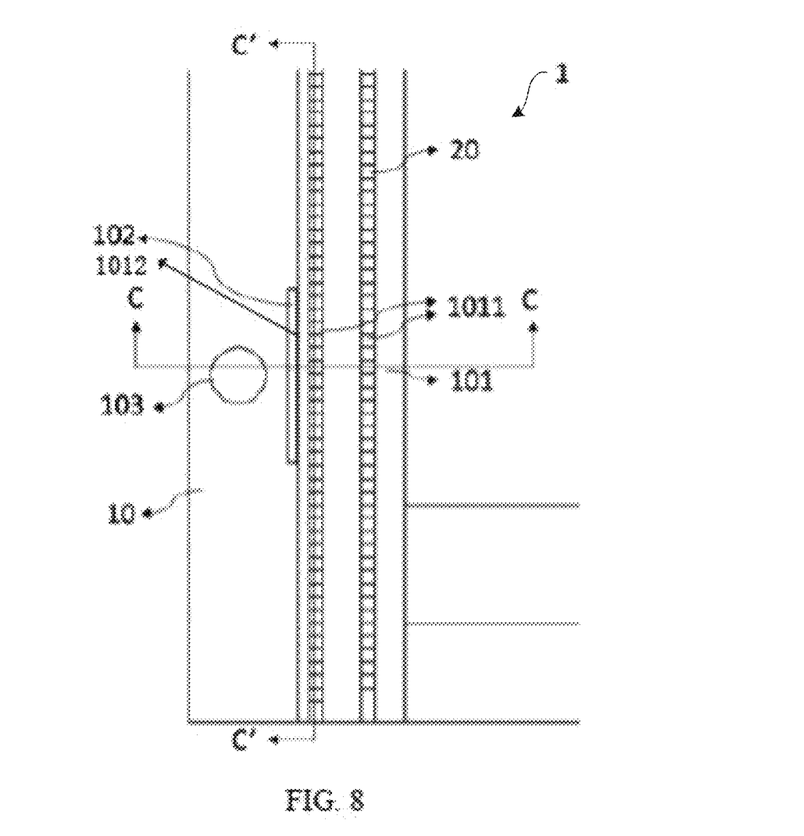
FIG. 8 is a top plan view of a backlight frame in accordance with an embodiment of the present disclosure.
Figure 9:
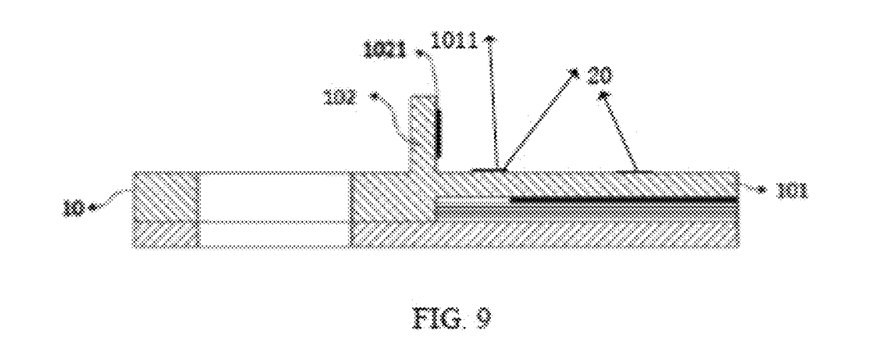
FIG. 9 is a cross-sectional view taken along line C-C of FIG. 8.
Figure 10A:
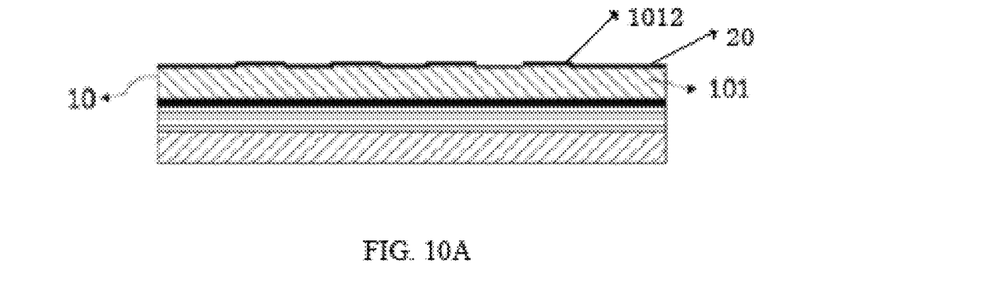
FIG. 10A is a cross-sectional view taken along line C'-C' of FIG. 8.
Figure 10B:
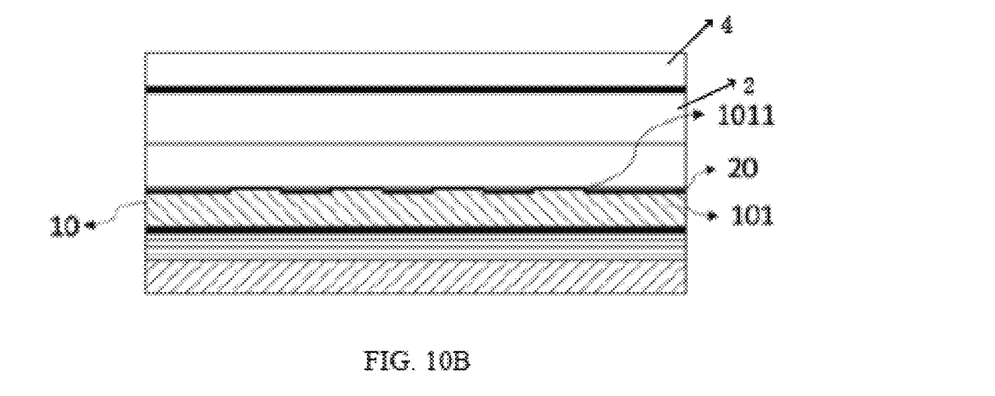
FIG. 10B is a cross-sectional view taken along line C'-C' of FIG. 8 when a display device is assembled onto the backlight frame.

In some embodiments, as shown in FIG. 8, FIG. 9 and FIGS. 10A and B, the inner side region of the planar portion 101 of the plastic frame 10 (i.e., the side of the retaining wall 102 facing the liquid crystal panel) has a plurality of columns of protuberances 1011 integrally molded with plastic frame by the injection molding process. The soft adhesive strip 20 is adhered to the region where the protuberance 1011 is located and covers the protuberance 1011. Protuberances 1011 in each column are spaced apart along the extending direction of the retaining wall 102 (as shown in FIG. 10A). Two adjacent columns of protuberances 1011 are staggered in the extending direction of the retaining wall 102 (as shown in FIG. 8). In this design, a plurality of columns of the comb-shaped soft adhesive strips 20 staggered with each other can form complementary hollow portions, which are more effective for preventing foreign matters from entering the inside of the backlight.

In some embodiments, spacing between at least two of the soft adhesive strips is greater than or equal to 0.5 mm and less than or equal to 5 mm. The spacing between the plurality of the soft adhesive strips 20 substantially parallel to each other in FIG. 1 to FIG. 10A is 1 mm. Generally, if the foreign matter is less than 0.5 mm, optical performance of the backlight is less affected. When the spacing between two adjacent soft adhesive strips 20 is greater than 0.5 mm, a certain number of small foreign matters are allowed to be accommodated between the adjacent soft adhesive strips 20, which can also meet the design requirement of small-sized display. Considering the current demand for a narrow bezel, the width of the plastic frame 10 is as small as possible. When the number of the soft adhesive strips 20 is 2 (minimum) and the spacing between those two strips is less than 5 mm, it is easier to design a narrow bezel product, and can meet the requirement of accommodating large foreign matters. In a another embodiment spacing is 1 mm Generally, the spacing is a distance between adjacent silicone pad bodies.

In some embodiments, as shown in FIG. 2, FIG. 6 or FIG. 9, the retaining wall 102 and the plastic frame 10 are integrally formed by the injection molding process. This simplifies the assembly process. A length of the retaining wall 102 is less than a length of the soft adhesive strips 20 in the extending direction of the retaining wall. Further, a silicone pad 1021 is pasted to the side of the retaining wall 102 facing the inner side region of the planar portion 101. It should be noted that the silicone pad 1021 may be the same material as the plurality of the soft adhesive strips 20 substantially parallel to each other, or may be different. The retaining wall 102 is configured to abut the side edge of the liquid crystal panel 2, so as to prevent movement of the liquid crystal panel 2 and also prevent foreign matters from entering the inside of the backlight. However, the contact and friction between the side edge of the liquid crystal panel 2 and the retaining wall 102 may also generate debris and foreign matter. Therefore, reducing the length of the retaining wall can reduce the generation of foreign matter.

In some embodiments, as shown in FIG. 1, FIG. 3, FIG. 4, FIG. 5 or FIG. 8, the screw hole 103 is located in a range of the long side of the planar portion 101 corresponding to the extending direction of the retaining wall 102, that is, an outline edge of the screw hole does not exceed the edge of the long side of the retaining wall 102. This design facilitates the retaining wall 102 to prevent debris within the screw hole 103 from moving toward the inside of the backlight, and block the debris within the range of the retaining wall 102.

In some embodiments, the soft adhesive pad is in contact with a side surface of the panel, and a width of the soft adhesive pad in a thickness direction of the panel is greater than or equal to one-half of a thickness of the panel. As shown in FIG. 2, the width of the silicone pad 1021 in the thickness direction of the panel 2 may be greater than or equal to one-half of the thickness of the panel 2, so that side edges of the liquid crystal panel 2 can be stably and firmly abutted.

In some embodiments, the backplane has four sides (not shown). The plastic frame is located on two opposite sides of the four sides of the backplane, and the two opposite sides are two of the four sides having a relatively short length.

In some embodiments, the soft adhesive strips are disposed in a direction parallel to the extending direction of the retaining wall, and the soft adhesive strips extend to a side edge of the planar portion, and a gap between the adjacent soft adhesive strips is in communication with an outer space of the planar portion.

Figure 11:
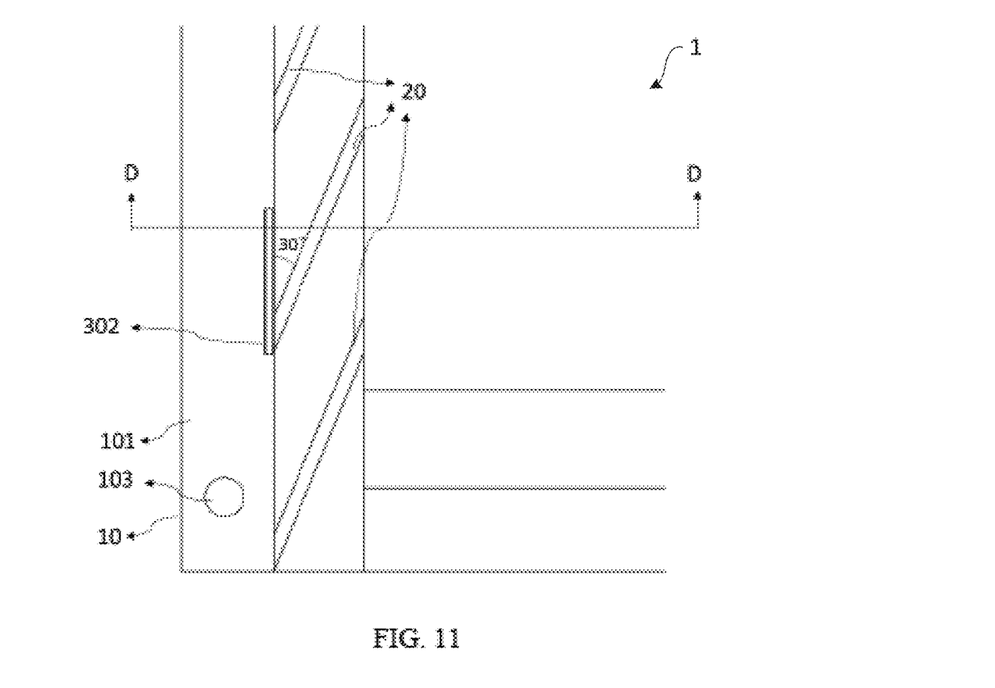
FIG. 11 is a top plan view of a backlight frame in accordance with an embodiment of the present disclosure.
Figure 12:
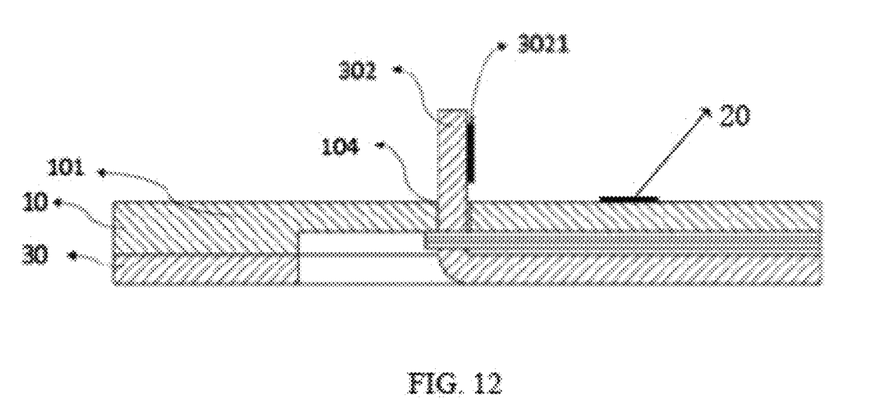
FIG. 12 is a cross-sectional view taken along line D-D of FIG. 11.

FIG. 11 and FIG. 12 illustrate another embodiment of the backlight frame according to the present disclosure. As shown in FIG. 11, the backlight frame 1 includes the rigid plastic frame 10 having the planar portion 101 carrying the liquid crystal panel. The side of the planar portion 101 near the long side is provided with a retaining wall 302 substantially perpendicular to the planar portion 101. The retaining wall includes a side facing the panel and a side away from the panel. The retaining wall 302 is configured to abut the side edge of the liquid crystal panel. The planar portion 101 is divided into two regions by the retaining wall 302, and the plurality of soft adhesive strips 20 (for example, silicone pads) which are substantially parallel to each other are provided on the inner side region of the planar portion near the inner side. In other words, the soft adhesive strips are on the side facing the panel and are in contact with the panel. The outer side region of the planar portion near the outer side is provided with one screw hole 103. In other words, on the side of the retaining wall 302 facing the liquid crystal panel 2, the planar portion 101 is provided with the plurality of soft adhesive strips substantially parallel to each other; and on the side of the retaining wall 302 away from the liquid crystal panel 2, the planar portion 101 is provided with the screw hole (not shown). The screw hole may be a self-tapping screw hole. When assembled with a screw, the debris in the screw hole is easily scattered to the periphery, which is one of the sources of foreign matters in the backlight. As shown in FIG. 12, the backlight frame 1 further includes a metal backplane 30. The backplane 30 is provided with a screw hole (not shown) of the same size as the screw hole 103 in the outer side region of the planar portion of the plastic frame 10, so that the plastic frame 10 and the backplane 30 are fixed together by a screw. The plurality of the soft adhesive strips 20 substantially parallel to each other are disposed obliquely at an acute angle to a direction of the long side of the retaining wall 302 (i.e., extending direction of the retaining wall), and the acute angle is less than 60° (about 30° as shown in the drawings). It is known to those skilled in the art that after the liquid crystal panel and the backlight frame are assembled, they are generally placed vertically when in use, that is, the surface of the liquid crystal panel is at a right angle to the ground. According to the present disclosure, when an angle between the soft adhesive strip 20 and a long side of the retaining wall 302 becomes larger, the greater the friction between the liquid crystal panel 2 and the soft adhesive strip 20 is. The panel is not easy to move, which reduces foreign matters caused by friction. However, if the angle between the two is too large, such as 90°, more soft rubber strips 20 are needed, and the gap between adjacent soft adhesive strips is larger and a channel where the foreign matter enters the optical film material in the middle of the backlight is made shorter, so that the foreign matter is more likely to enter the backlight and cause optical defects. Therefore, when the angle between the soft adhesive strip and the retaining wall is an acute angle less than 60°, it can achieve the effect of reducing the movement of the liquid crystal panel and prevent foreign matters from entering the backlight. In some embodiments, the acute angle is less than or equal to 45°. In this case, a good effect can also be achieved. After the test, when the angle is 45°, the probability of foreign matters entering the optical film will also decrease by 80% compared with the angle of 90°. Considering the effect of preventing foreign matters from entering and the movement of the liquid crystal panel, the acute angle is less than or equal to 45°, which can basically meet product yield. In some embodiments, the acute angle is 30°. In another embodiment, the movement of the liquid crystal panel 2 and the probability that foreign matters enter the backlight reach a relatively balanced ideal state. The barrier zone is formed by the plurality of soft adhesive strips 20 which are substantially parallel to each other, the foreign matters in the outer side region of the planar portion 101 is prevented from diffusing toward the inside of the backlight, thereby increasing the distance required for foreign matters to enter the inside of the backlight, and delaying the entry of the foreign matters. In addition, it can be known by skilled person in the art that friction between the liquid crystal panel 2 and the plurality of soft adhesive strips 20 which are obliquely disposed is larger than that in a case that the soft adhesive strip 20 are not obliquely disposed, so that the liquid crystal panel is not easily moved. Thereby, generation of the foreign matters due to friction can be reduced, the inclination angle is small, the number of required silicone pads can be reduced, and the effect is better.

Figure 13:
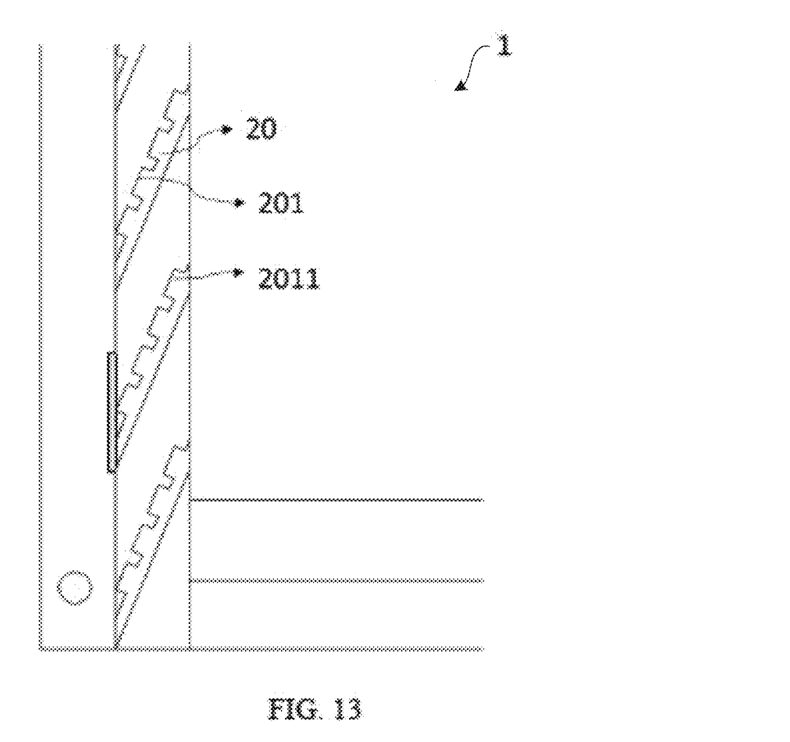
FIG. 13 is a top plan view of a backlight frame in accordance with an embodiment of the present disclosure.
Figure 14:
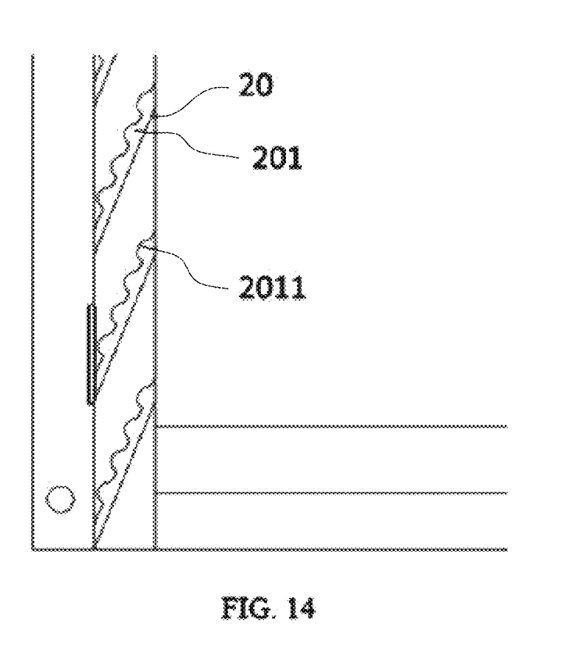
FIG. 14 is a top plan view of a backlight frame in accordance with an embodiment of the present disclosure.

In some embodiments, as shown in FIG. 13 or FIG. 14, the plurality of silicone pads have a zigzag structure 201 formed by protrusions 2011 spaced apart on the side edge of the soft adhesive strip 20. The zigzag structure 201 can increase the difficulty of moving foreign matters toward an inside of the backlight, and better achieve an effect of preventing foreign matters from entering the inside of the backlight. It should be noted that the shape of the protrusion 2011 may be a rectangle, a cured shape, a semicircle shape or other irregular shapes. The zigzag structures of adjacent silicone pads may be disposed facing to each other, or face the same direction.

In some embodiments, as shown in FIG. 12, the planar portion 101 of the plastic frame has an opening 104. The backplane 30 is provided with a bent portion 302 that is bent toward the planar portion of the plastic frame 10. The bent portion 302 passes through the opening 104 of the planar portion 101. A side of the bent portion 302 facing the inner side of the liquid crystal panel is pasted with a silicone pad 3021. The bent portion 302 serves as a retaining wall that abuts the side edge of the liquid crystal panel, that is, the metal backplane 30 serves as the retaining wall, which can increase the hardness of the retaining wall, reduce the movement of the liquid crystal panel 2, reduce foreign matters generated by friction, and make the backplane 30 more securely assembled with the plastic frame 10.

In some embodiments, the soft adhesive pad is in contact with a side surface of the panel, and a width of the soft adhesive pad in a thickness direction of the panel is greater than or equal to one-half of a thickness of the panel. As shown in FIG. 12, the width of the silicone pad 3021 in the thickness direction of the panel 2 may be greater than or equal to one-half of the thickness of the panel 2, so that side edges of the liquid crystal panel 2 can be stably and firmly abutted.

In some embodiments, the backplane has four sides (not shown). The plastic frame is located on two opposite sides of the four sides of the backplane, and the two opposite sides are two of the four sides having a relatively short length. Through the above invention, the following problems are solved: in the manufacturing process in which the backlight is fixed to the panel and the front frame, debris of the material, debris falling off the screw holes, debris generated by friction, and the like remain in the periphery of the plastic frame; the debris easily enters the inside of the backlight; after the assembly is completed, during the LCD transportation process, foreign matters will also enter a surface of an optical film inside the backlight, causing scratches on the optical film to form white spots, or affecting light transmission to form dark spots, making the LCD display poor.

Hereinafter, a display device of the present disclosure will be further described by taking a liquid crystal display device as an example. It should be understood that the present disclosure is not limited to the liquid crystal display device.

The liquid crystal display device generally includes a liquid crystal display panel that displays an image, a light source system that supplies visible light to the liquid crystal display panel and is located at the back of the liquid crystal display panel, and a frame system structure that carries and fixes the liquid crystal display panel and the light source.

The light source and the frame system structure together constitute a backlight module of the liquid crystal display device. The frame system includes a backplane carrying the light source and the optical film, and a frame configured to carry the liquid crystal display panel and fix (or limit) the position of the optical film after being assembled with the backplane.

Figure 15:
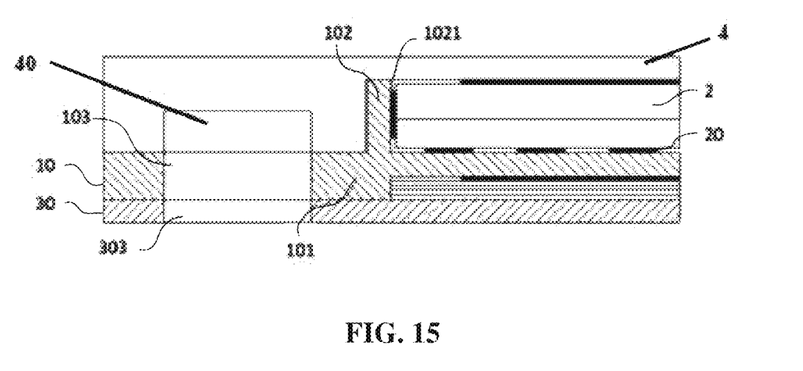
FIG. 15 is a top plan view of a display device in accordance with an embodiment of the present disclosure.

A liquid crystal display device provided by the present disclosure is illustrated in FIG. 15. As shown in FIG. 15, the liquid crystal display device includes a liquid crystal panel 2, a plastic frame 10, and a backplane 30. The plastic frame 10 and the backplane 30 constitute a backlight frame. The backlight frame further includes an optical film such as a reflection sheet, a prism sheet, and a diffusion sheet. The planar portion 101 of the plastic frame carries an edge plane of the liquid crystal panel 2, and a plurality of adhesive strips 20 substantially parallel to each other are in contact with the bottom of the liquid crystal panel 2. A silicone pad 1021 is pasted to the side of the retaining wall 102 facing the liquid crystal panel, so as to abut the side edge of the liquid crystal panel 2. The plastic frame 10 and the backplane 30 respectively have a screw hole 103 and a screw hole 303, and the plastic frame 10 and the backplane 30 are assembled and fixed by a screw. The liquid crystal display device provided in the embodiment can effectively reduce optical defect of the backlight and improve display effect.

Figure 16:
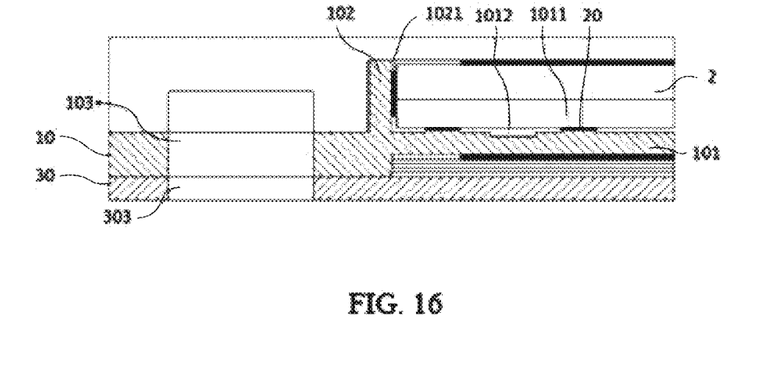
FIG. 16 is a top plan view of a display device in accordance with an embodiment of the present disclosure.
Figure 17:
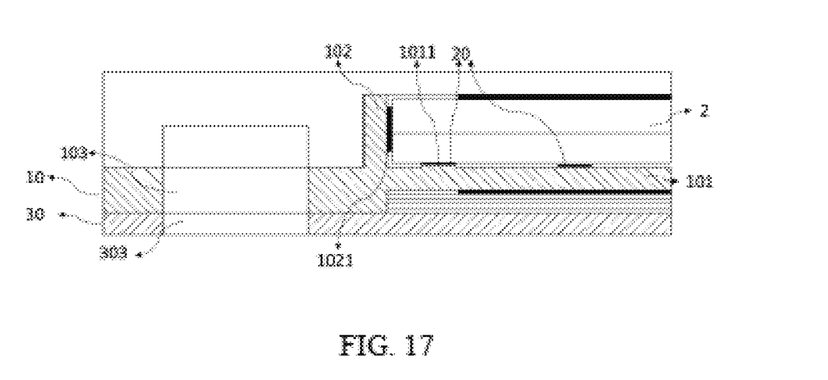
FIG. 17 is a top plan view of a display device in accordance with an embodiment of the present disclosure.
Figure 18:
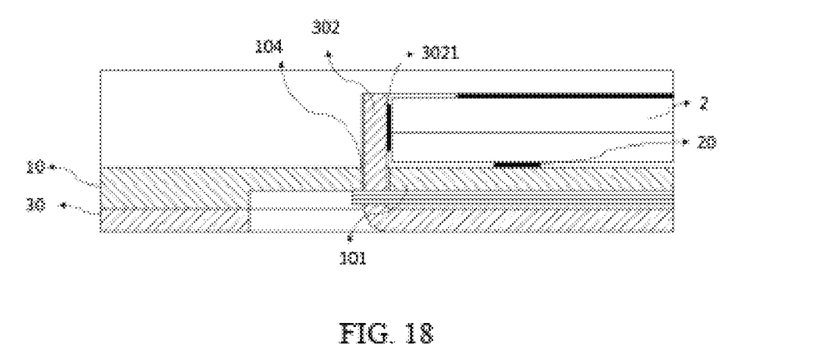
FIG. 18 is a top plan view of a display device in accordance with an embodiment of the present disclosure.

A liquid crystal display device provided by the present disclosure is shown in FIG. 16 to FIG. 18. The liquid crystal display device includes a liquid crystal panel 2, a plastic frame 10, and a backplane 30. The plastic frame 10 and the backplane 30 constitute a backlight frame. The backlight frame further includes an optical film such as a reflection sheet, a prism sheet, and a diffusion sheet. The liquid crystal panel 2 is placed in the backlight frame, which may be various embodiments of the backlight frame provided in the present disclosure. The positional relationship can be understood by the skilled person in the art based on the contents of the present disclosure, thus will not be discussed here. In addition, manner of fixing the front frame, which covers the liquid crystal panel 2, to the backlight frame is also well known to the skilled person in the art. The manner of fixing may be, for example, side-engagement or screw-lock.

In some embodiments, the display device further includes a front frame 4. The front frame 4 has a front frame assembly portion 40, and the front frame assembly portion and the plastic frame assembly portion are configured to fix the front frame 4 and the backlight frame 1 together. As shown in FIG. 15 to FIG. 18, the front frame assembly portion 40 of the front frame 4 is aligned with the plastic frame assembly portion 103, thereby fixing the front frame 4 and the backlight frame 1 together.

In some embodiments, each of the front frame assembly portion 40 and the plastic frame assembly portion is a screw hole, and a diameter of the screw hole of the front frame assembly portion 40 is less than or equal to a diameter of the screw hole of the plastic frame assembly portion.

In some embodiments, the front frame 4 includes a gasket 41 attached to a side surface of the front frame facing the panel, and a material of the gasket 41 is the same as that of the soft adhesive strips. As shown in FIG. 15 to FIG. 18, the gasket 41 is attached to the side surface of the front frame facing the panel, so that the panel 2 can be stably held between the front frame 4 and the backlight frame.

The present disclosure has been described by the above described related embodiments. However, the above embodiments are merely examples for implementing the present disclosure. It must be noted that the disclosed embodiments do not limit the scope of the disclosure. Instead, modifications and equivalent arrangements are intended to be included within the scope of the disclosure.

What is claimed is:

1. A backlight frame, comprising:
   a backplane;
   a plastic frame comprising: a planar portion configured to carry a panel, and a plastic frame assembly portion on the side away from the panel, the plastic frame assembly portion being configured to fix the plastic frame to the backplane;
   a retaining wall substantially perpendicular to the planar portion, the retaining wall comprising a side facing the panel and a side away from the panel; and
   a plurality of soft adhesive strips substantially parallel to each other on the planar portion, the soft adhesive strips being on the side facing the panel and in contact with the panel,
   wherein the plurality of soft adhesive strips comprises at least a first soft adhesive strip and a second soft adhesive strip, wherein the first soft adhesive strip and the second soft adhesive strip are spaced apart on the planar portion along a direction perpendicular to an extending direction of the retaining wall, and the first soft adhesive strip is adjacent to the retaining wall,
   wherein the plurality of soft adhesive strips are not connected to each other,
   wherein a side of the retaining wall facing the soft adhesive strips is disposed with a soft adhesive pad, the retaining wall is integrally formed with the plastic frame, and a length of the retaining wall is smaller than a length of the soft adhesive strips in the extending direction of the retaining wall, and
   wherein the plastic frame assembly portion comprises a screw hole located in a region of the planar portion corresponding to a long side of the retaining wall in the extending direction.

2. The backlight frame according to claim 1, wherein the soft adhesive strips extend in a direction parallel to an extending direction of the retaining wall.

3. The backlight frame according to claim 1, wherein the soft adhesive strips are disposed at an acute angle to an extending direction of the retaining wall, and the acute angle is less than or equal to 60°.

4. The backlight frame according to claim 1, wherein the soft adhesive strips are disposed at an acute angle to an extending direction of the retaining wall, and the acute angle is less than or equal to 45°.

5. The backlight frame according to claim 1, wherein the soft adhesive strips are disposed at an acute angle to an extending direction of the retaining wall, and the acute angle is 30°.

6. The backlight frame according to claim 1, wherein surfaces of at least two of the plurality of the soft adhesive strips have a zigzag structure.

7. The backlight frame according to claim 6, wherein a shape of the zigzag structure is curved or rectangular.

8. The backlight frame according to claim 1, wherein the planar portion comprises a plurality of columns of raised structures and a groove disposed between two columns of the raised structures, the plurality of the columns of the raised structures are spaced apart on the planar portion along a direction perpendicular to an extending direction of the retaining wall, and the soft adhesive strips are positioned on the raised structures.

9. The backlight frame according to claim 1, wherein the planar portion comprises a plurality of columns of raised structures, the plurality of the columns of the raised structures are spaced apart on the planar portion along a direction perpendicular to an extending direction of the retaining wall, two adjacent columns of the raised structures are staggered in the extending direction of the retaining wall, and the soft adhesive strips are positioned on the raised structures.

10. The backlight frame according to claim 2, wherein spacing between at least two of the soft adhesive strips is greater than or equal to 0.5 mm and less than or equal to 5 mm.

11. The backlight frame according to claim 1, wherein the planar portion has an opening, the retaining wall is a bent portion of the backplane that is bent toward the planar portion and passes through the opening, and a side of the bent portion facing the soft adhesive strips is pasted with a soft adhesive pad.

12. The backlight frame according to claim 1, wherein the backplane has four sides, the plastic frame is located on two opposite sides of the four sides of the backplane, and the two opposite sides are two of the four sides having a relatively short length.

13. The backlight frame according to claim 2, wherein the soft adhesive strips extend to a side edge of the planar portion, and a gap between the adjacent soft adhesive strips is in communication with an outer space of the planar portion.

14. A display device, comprising the panel and a backlight frame according to claim 1, wherein the panel is placed in the backlight frame.

15. The display device according to claim 14, further comprising a front frame, wherein the front frame has a front frame assembly portion, and the front frame assembly portion and the plastic frame assembly portion are configured to fix the front frame and the backlight frame together.

16. The display device according to claim 15, wherein each of the front frame assembly portion and the plastic frame assembly portion comprises a screw hole, and a diameter of the screw hole of the front frame assembly portion is less than or equal to a diameter of the screw hole of the plastic frame assembly portion.

17. The display device according to claim 16, wherein the front frame comprises a gasket attached to a side surface of the front frame facing the panel, and a material of the gasket is the same as that of the soft adhesive strips.

18. The backlight frame according to claim 1, wherein the soft adhesive pad is in contact with a side surface of the panel, and a width of the soft adhesive pad in a thickness direction of the panel is greater than or equal to one-half of a thickness of the panel.

19. The backlight frame according to claim 1, wherein the planar portion comprises a plurality of columns of raised structures and a groove disposed between two columns of the raised structures, the plurality of the columns of the raised structures are spaced apart on the planar portion and the soft adhesive strips are positioned on the raised structures.

* * * * *